Figure 1:
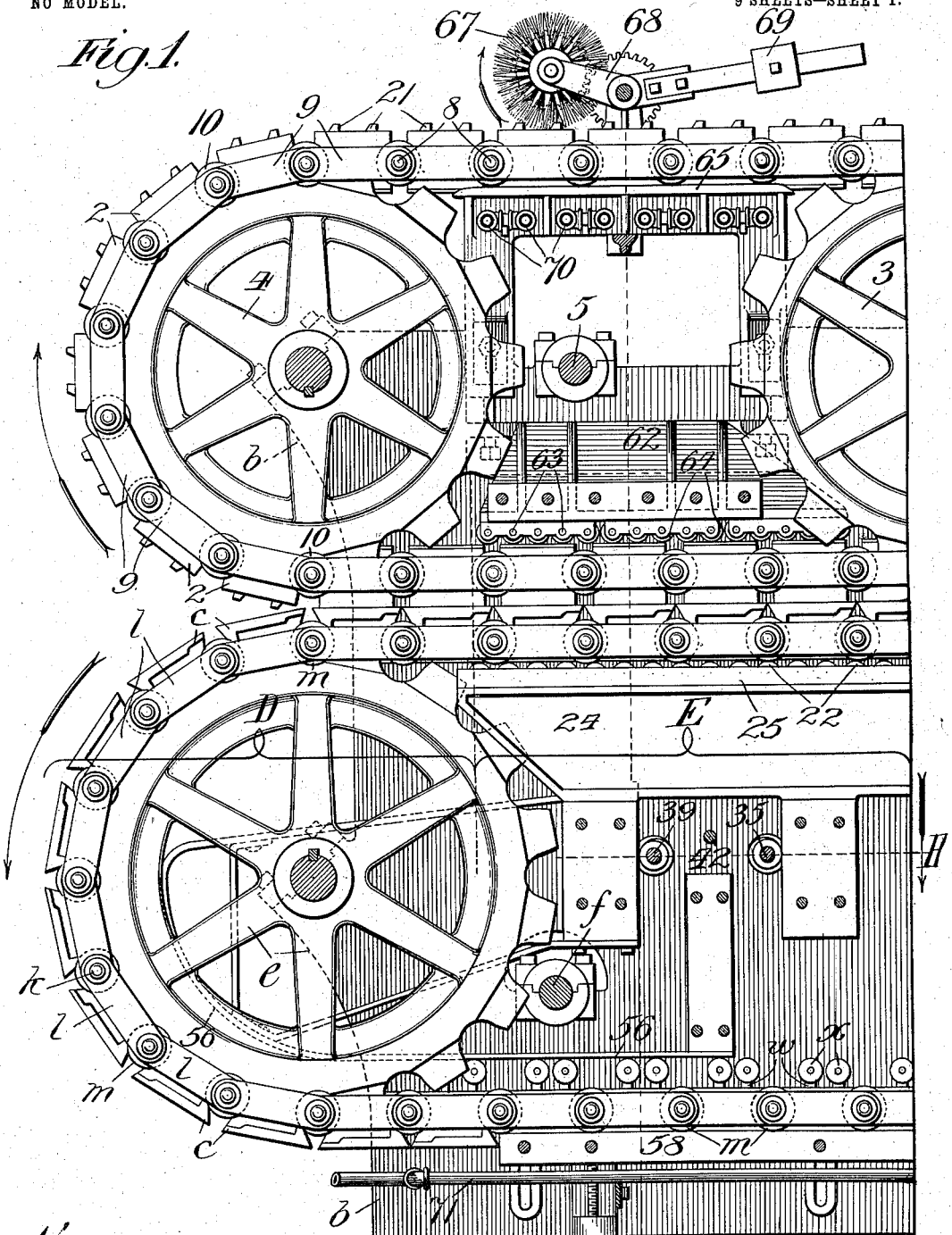

No. 752,565. PATENTED FEB. 16, 1904.
W. A. KÖNEMAN.
BRIQUETING MACHINE.
APPLICATION FILED MAR. 17, 1903.
NO MODEL. 9 SHEETS—SHEET 1.

Witnesses:
Inventor:
William A. Köneman
by Dyrenforth, Dyrenforth & Lee,
Attys.

No. 752,565. PATENTED FEB. 16, 1904.
W. A. KÖNEMAN.
BRIQUETING MACHINE.
APPLICATION FILED MAR. 17, 1903.
NO MODEL. 9 SHEETS—SHEET 2.

Witnesses: Inventor:
William A. Köneman,
By Dyrenforth Dyrenforth & Lee,
Attys.

No. 752,565. PATENTED FEB. 16, 1904.
W. A. KÖNEMAN.
BRIQUETING MACHINE.
APPLICATION FILED MAR. 17, 1903.
NO MODEL. 9 SHEETS—SHEET 4.

Witnesses:
Chas. E. Gaylord.
Geo. E. Davis(?)

Inventor:
William A. Köneman,
By Dyrenforth, Dyrenforth & Lee,
Attys.

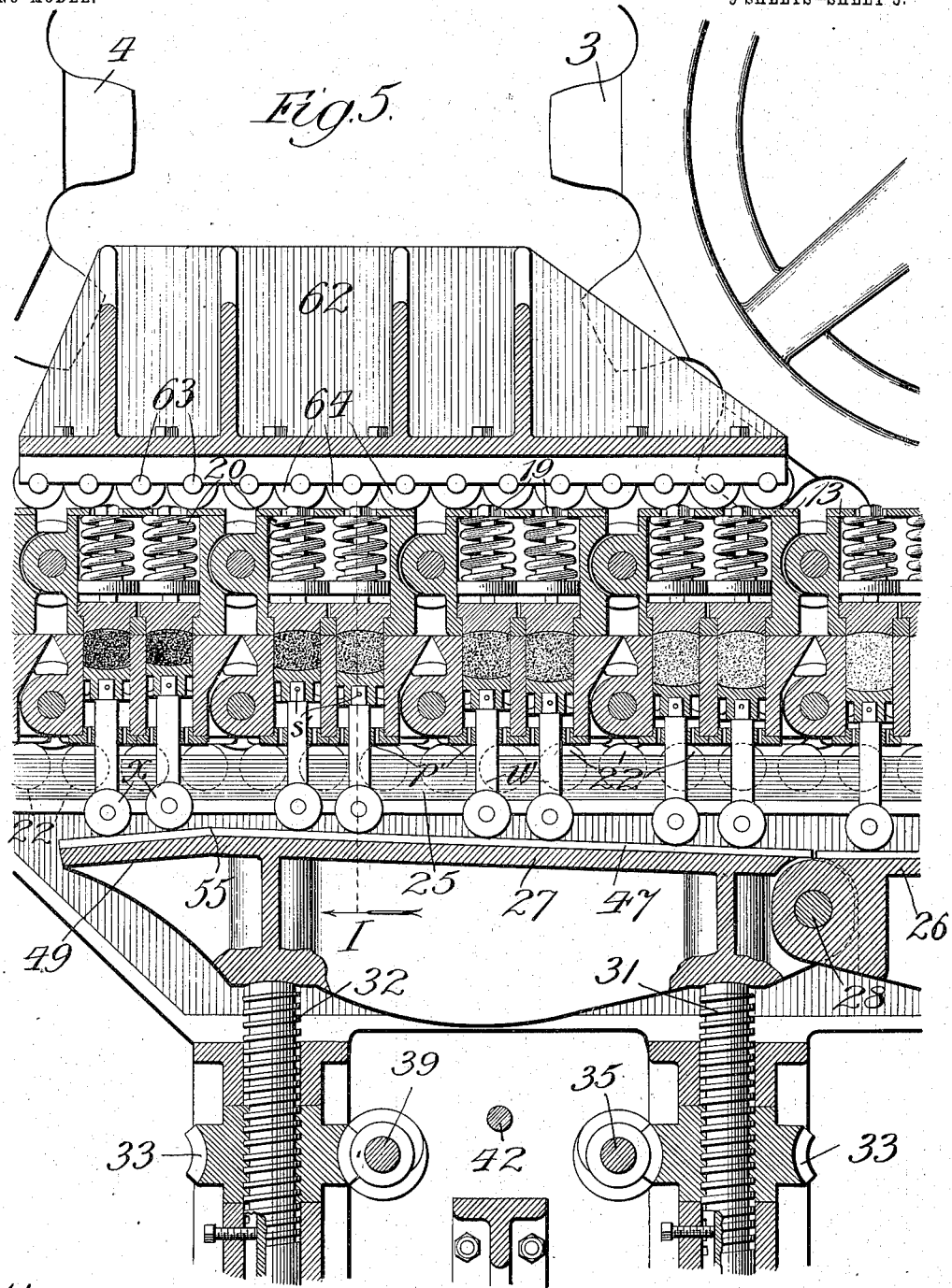

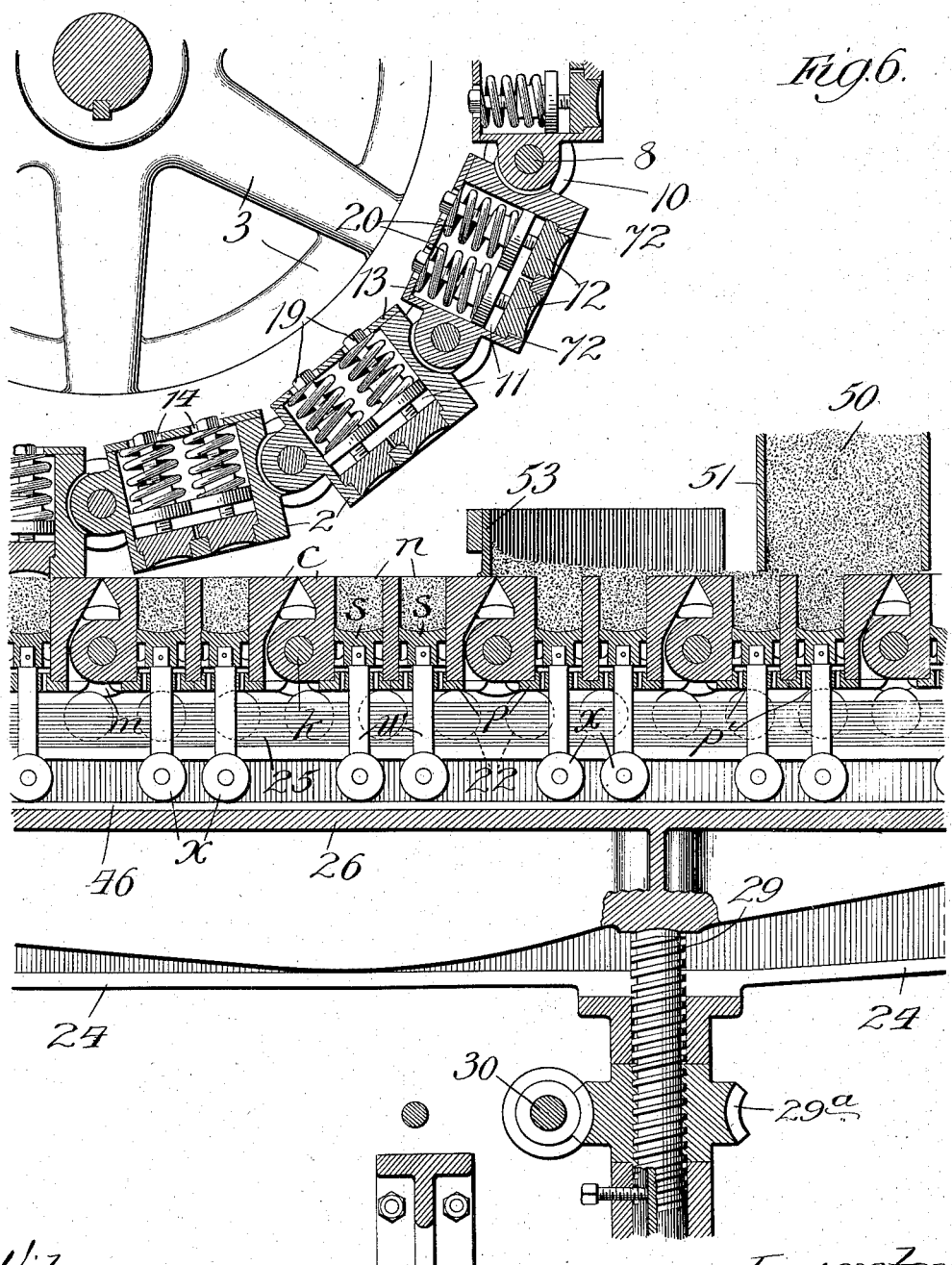

No. 752,565. PATENTED FEB. 16, 1904.
W. A. KÖNEMAN.
BRIQUETING MACHINE.
APPLICATION FILED MAR. 17, 1903.
NO MODEL. 9 SHEETS—SHEET 7.

Witnesses:
Chas. E. Gaylord.
Geo. C. Davison.

Inventor:
William A. Köneman,
By Dyrenforth, Dyrenforth & Lee,
Attys.

No. 752,565. PATENTED FEB. 16, 1904.
W. A. KÖNEMAN.
BRIQUETING MACHINE.
APPLICATION FILED MAR. 17, 1903.
NO MODEL. 9 SHEETS—SHEET 8.

Witnesses:
Chas. E. Gaylord,
Geo. C. Davison.

Inventor,
William A. Köneman,
By Dyrenforth, Dyrenforth & Lee,
Attys.

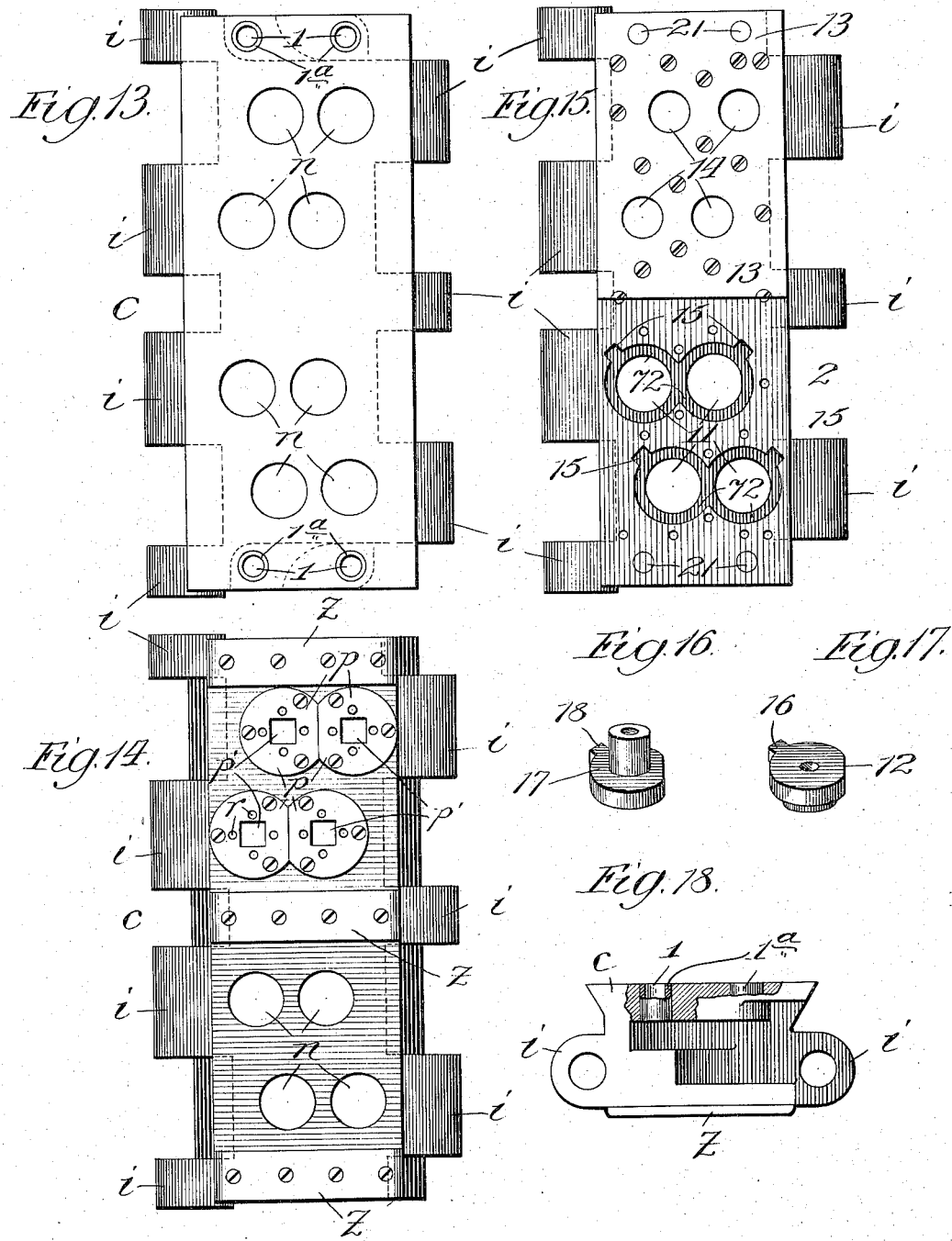

No. 752,565.

Patented February 16, 1904.

UNITED STATES PATENT OFFICE.

WILLIAM A. KÖNEMAN, OF CHICAGO, ILLINOIS.

BRIQUETING-MACHINE.

SPECIFICATION forming part of Letters Patent No. 752,565, dated February 16, 1904.

Application filed March 17, 1903. Serial No. 148,244. (No model.)

*To all whom it may concern:*

Be it known that I, WILLIAM A. KÖNEMAN, a citizen of the United States, residing at Chicago, in the county of Cook and State of Illinois, have invented a new and useful Improvement in Briqueting-Machines, of which the following is a specification.

My invention relates to improvements in briquet-making machines of a type first shown and described by me in United States Patent No. 724,588, dated April 7, 1903. In these machines the molds and mold-covers are formed in the links of companion endless belts, the molds being provided with plungers having stems which move through a prolonged course, while the molds are closed across an inclined plane to effect gradual compression of the briquet material previously fed to the molds.

My present object is to provide certain improvements upon my former construction with a view to simplifying the machine and increasing its efficiency. Generally stated, these improvements are as follows: first, means for adjusting the height and angle of the inclined plane or planes to regulate the capacity of the molds and the compression of the briquet material; second, changes in the construction of the lower or mold-containing links, plungers, and means for advancing and retracting the same; third, individual cushioning-springs for the mold-covers as a substitute for the cushioning-bed for the upper links; fourth, means for heating the molds when the character of the briquet material renders such heating desirable, and, furthermore, various changes in details of construction of other parts of the machine.

Figure 2:
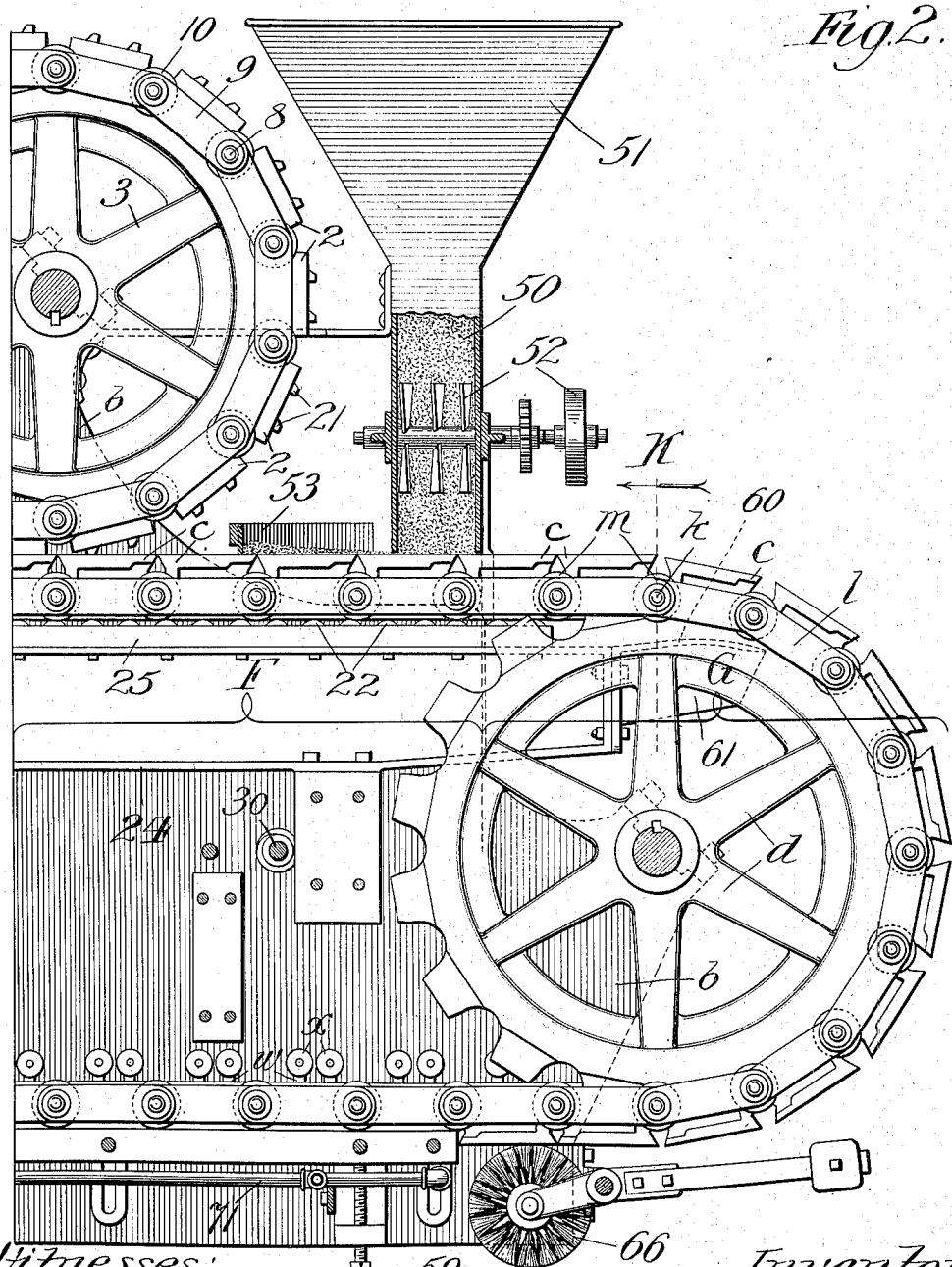
Figure 3:
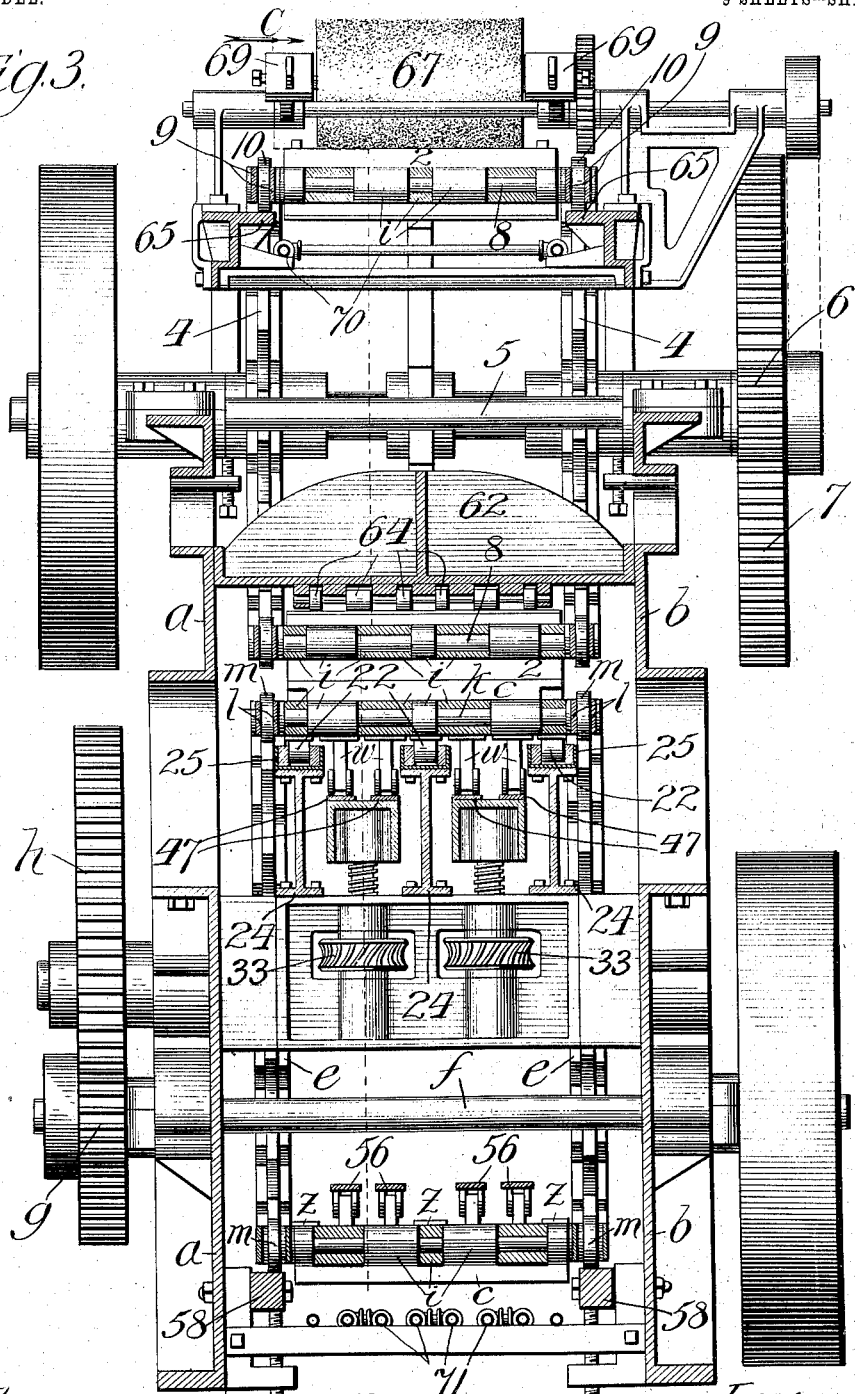
Figure 4:
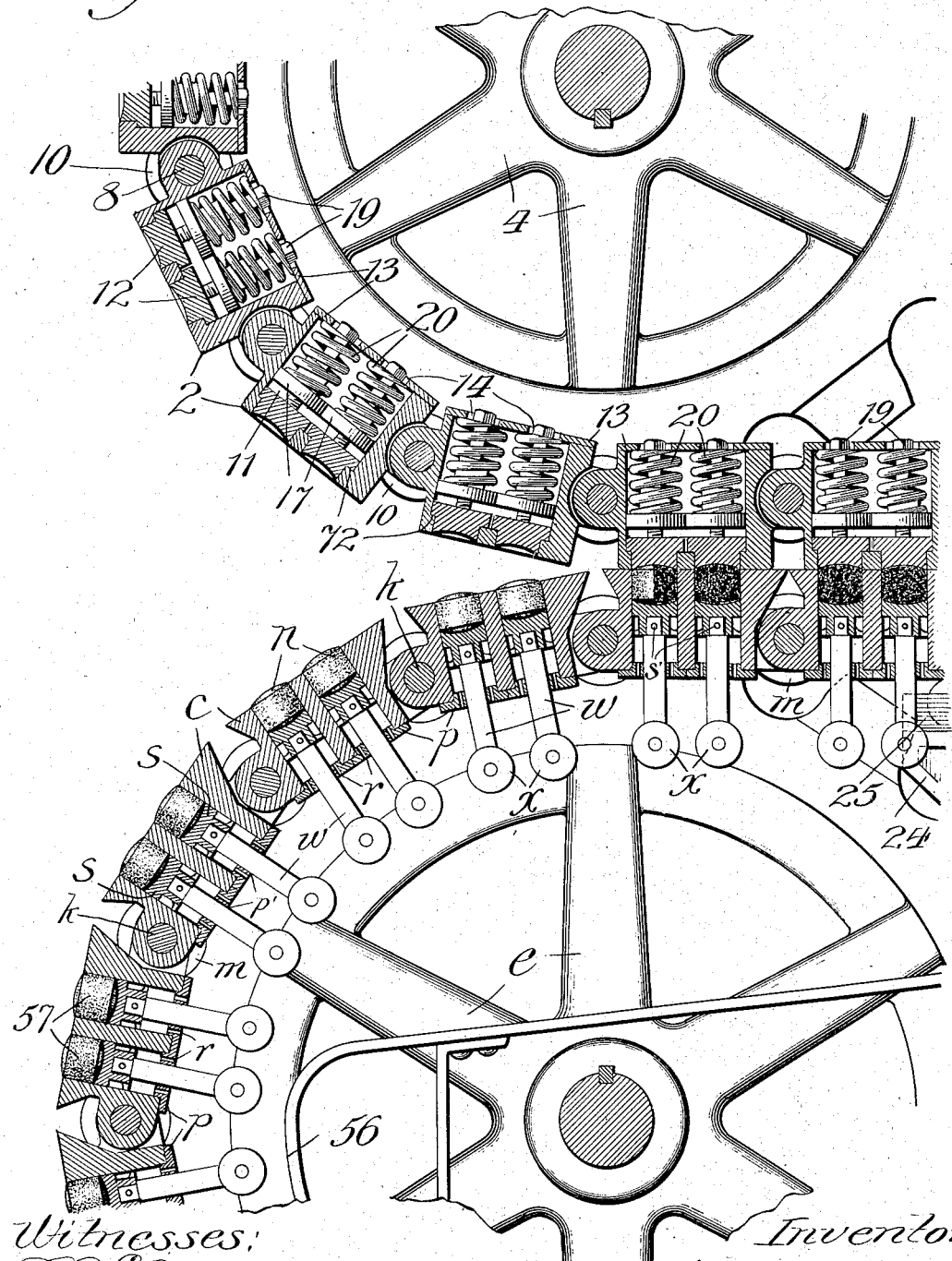
Figure 8:
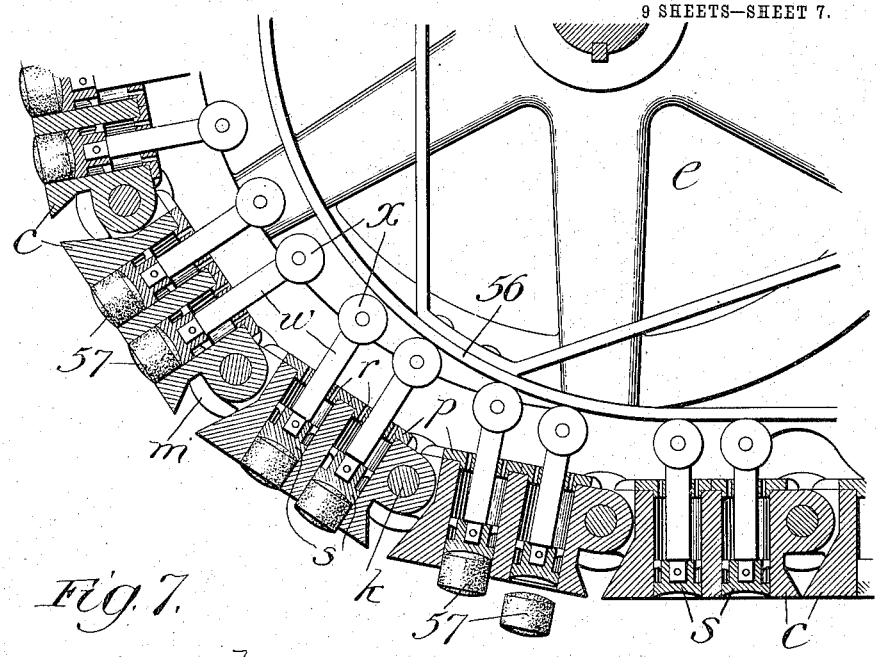
Figure 9:
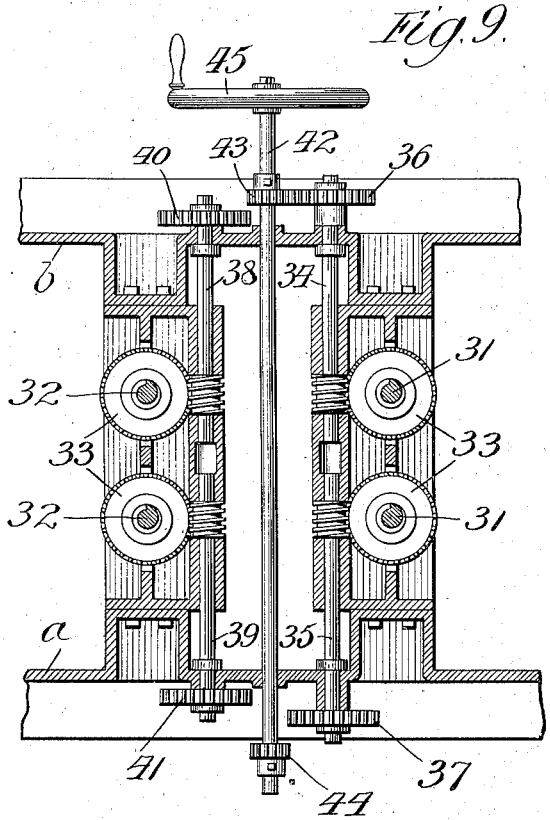
Figure 10:
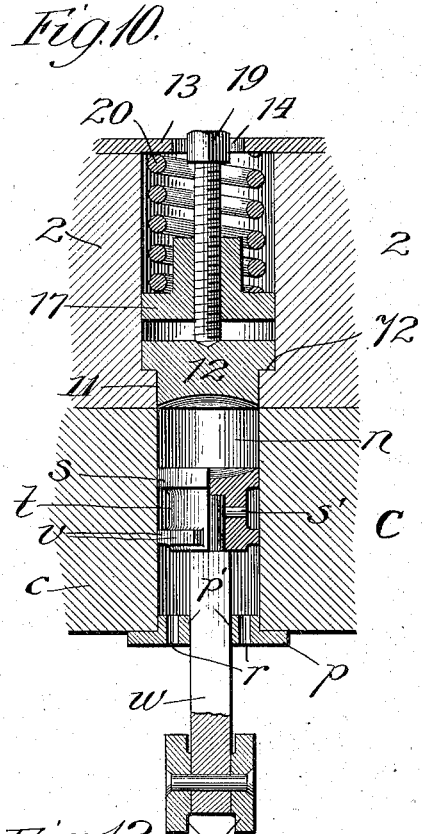
Figure 11:
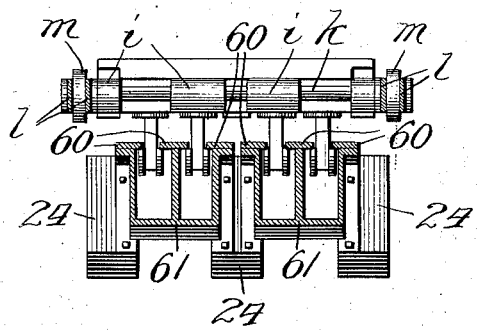
Figure 12:
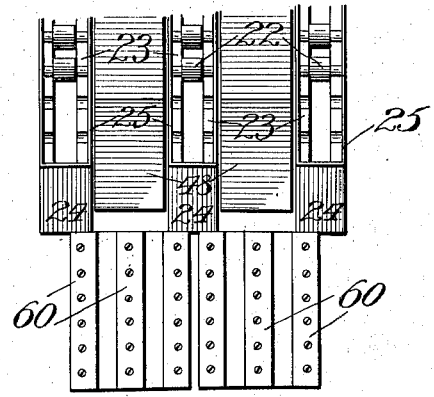

Referring to the drawings, Figures 1 and 2 taken together form a sectional side elevation of the entire machine, the section being taken just within one of the side frames or cheeks on dotted line A in Fig. 3; Fig. 3, a vertical cross-section taken on line B in Fig. 1; Figs. 4, 5, 6, and 7, enlarged sections taken on line C in Fig. 3, the scopes of the views being designated by the brackets D, E, F, and G, respectively, in Figs. 1 and 2; Fig. 8, a continuation in the downward direction of the parts shown in Fig. 4; Fig. 9, a broken plan section on line H in Fig. 1, showing adjusting means for raising and lowering the compression-bed; Fig. 10, an enlarged section on line I in Fig. 5; Fig. 11, a sectional view on line K in Fig. 2; Fig. 12, a broken plan view showing an antifriction sustaining-bed for the lower belt and plunger-retractors at the forward or right-hand end portion of the machine; Fig. 13, a plan view of the outer or obverse side of one of the endless series of lower links formed with mold-sections and carrying plungers; Fig. 14, a plan view of the reverse side of one of said lower links, the upper half of the view showing the plunger-stem guides in place and the lower half showing the same removed; Fig. 15, a plan view of the reverse side of one of the endless series of upper links which are provided with yielding mold-covers, the upper half of said view showing a retaining-plate for the springs in place, said plate being absent in the lower half of the view; Figs. 16 and 17, details of the construction of the yielding mold-covers; and Fig. 18, an end view, partly broken away, of one of the series of lower links.

The machine is constructed with side frames $a\ b$, suitably tied together and mounted upon a foundation. (Not shown.) The lower traveling belt, consisting of an endless series of links $c$, runs upon the forward and rear sprocket-wheels $d\ e$, respectively. This belt is driven from a power-shaft $f$, carrying a pinion $g$, meshing with a gear-wheel $h$ on the shaft of the sprocket-wheels $e$. Each link $c$ is formed, as shown in Figs. 13, 14, and 18, with perforated ears $i$, intermeshing with similar ears on the next adjacent links, the links being pivotally connected together by means of shafts $k$, which shafts are also pivotally connected together at opposite ends by overlapping side links $l$, in pairs, between which are journaled bearing-rollers $m$, as shown most plainly in Fig. 11. Each link $c$ is provided in the present construction with eight molds $n$, consisting of cylindrical openings through the body of the link. On the inner or reverse side of the link are bearing-caps $p$, having each a central square opening $p'$, surrounded by small air-vent openings $r$. The bearing-caps $p$ are fastened in place with screws, as shown. In each mold is a plunger-head $s$, having a concave upper side, a recess $t$ around its body portion, as shown in Fig. 10, and a scalloped guide-flange $v$ around its lower end portion. Each plunger-head $s$ is fastened, as by means of a pin $s'$, to the upper end of a square plunger-stem $w$, which passes through the square guide-openings $p'$ in the cap $p$ and is provided at its lower or outer end with a pair of antifriction-rollers $x$. At the center and opposite ends of the reverse side of each link $c$ are bearing-plates $z$. In the upper or obverse side of each link $c$, near opposite ends, are cylindrical sockets 1, lined with bushings $1^a$, as shown in Fig. 18.

The upper endless belt is formed of links 2 in endless series, traveling around forward and rear sprocket-wheels 3 4. The upper belt is driven from a power-shaft 5, carrying a pinion 6, meshing with a gear-wheel 7 on the shaft of the sprocket-wheels 4. The links 2 are provided, as shown in Fig. 15, with forward and rear perforated projecting ears $i$, which intermesh with each other and are connected together by means of shafts 8 and end links 9, between which end links are journaled rollers 10 upon the shafts 8. Each link 2 is formed with a face-plate portion having eight openings 11, as shown in Fig. 15, containing yielding mold-covers 12, formed with concaved outer faces. The covers 12 rest normally against annular shoulders 72. Fastened by means of screws (see Fig. 15) upon each link 2 is a plate 13, having openings 14 registering with the openings 11 in the opposite face of the link, but of smaller diameter than the said openings. The openings or chambers 11 are provided with grooves 15 to receive feathers 16 on the covers 12 to prevent their turning. In each opening 11 through the links 2 is an internally-threaded follower 17, having a feather 18, movable in the groove 15. The follower 17 is internally threaded to receive a set-screw 19, which bears against the rear or upper side of the cover 12. Confined between each follower 17 and the plate 13 is a stiff spring 20. The springs 20 operate to press the mold-covers 12 against the shoulders 72, and the springs may be tensioned to increase or diminish this pressure by turning the set-screws 19 to raise or lower the followers 17. The lower stretch of links of the upper belt, between the sprockets 3 4, move in the horizontal plane in close contact with the upper stretch of links of the lower belt, as shown in the drawings, and the links must meet in exact register. To insure their registering, studs 21 are provided near opposite ends of the links 2 to enter and engage the sockets 1 in the links of the lower belt. The studs 21 are inclined at their rear sides, as shown in Figs. 1 and 2, so as to enter freely the sockets 1. The studs 21 and bushings $1^a$ are so fastened to the links as to be removable and replaceable in case of wear.

Between the sprocket-wheels $d$ $e$ the upper stretch of the lower belt runs upon an antifriction-bed consisting of three longitudinal series of antifriction-rollers 22. The rollers 22 are journaled upon short shafts in bearing-strips 23, supported upon beams 24. The beams sustain the bearing-strips and form a rigid unyielding support for the links, which slide at their wearing-plates $z$ upon the rollers 22. The bearing-strips 23 are in longitudinally-extending troughs 25, which are kept filled with soap or other suitable lubricating material to lubricate the roller-journals.

Extending longitudinally between the beams 24 are two bearing-tracks for the plunger-rollers to move upon. Each bearing-track consists of a forward section 26 and a rear section 27, the two sections being pivotally connected together, as shown at 28, Fig. 5. Each forward section 26 is upon a jack-screw 29, running through a nut $29^a$, forming a worm-gear actuated from a worm-shaft 30. The rear section 27 of each track is supported upon forward and rear jack-screws 31 32, respectively, working through internally-threaded worm-wheel nuts 33.

The means for raising and lowering the sections 27 are shown in Fig. 9. The worm-wheels or nuts 33 on the jack-screws 31 are engaged, respectively, by the separate worm-shafts 34 35, carrying gear-wheels 36 37, and the worm-wheel nuts on the jack-screws 32 are engaged, respectively, by the separate worm-shafts 38 39, carrying gear-wheels 40 41, respectively. Journaled between the worm-shafts is a rotary and longitudinally-sliding shaft 42, having pinions 43 and 44 and a hand-wheel 45. The shaft 42 may be slid to cause its pinion 43 to engage either the gear 36 or the gear 40 or to cause its pinion 44 to engage either the gear 37 or 41, whereby any one of the nuts 33 may be turned to raise or lower the jack-screws 31 and 32 independently to raise or lower either track-section 27 at either or both ends.

On each track-section 26 is a removable and replaceable wearing-plate 46, and on the track-sections 27 are similar removable and replaceable wearing-plates 47, the wearing-plates forming the tracks proper for the rollers $x$ to move upon. The track-sections 26 have downward-inclined forward ends 48, (see Fig. 7,) and the track-sections 27 have downward-inclined rear ends 49. In operation the track-sections 26 will extend in a horizontal plane parallel with the bearing-rollers 22, while the track-sections 27 are upwardly inclined, as shown in Fig. 5, to form inclined planes for raising the mold-plungers and compressing the briquets, as hereinafter described.

Figure 7:
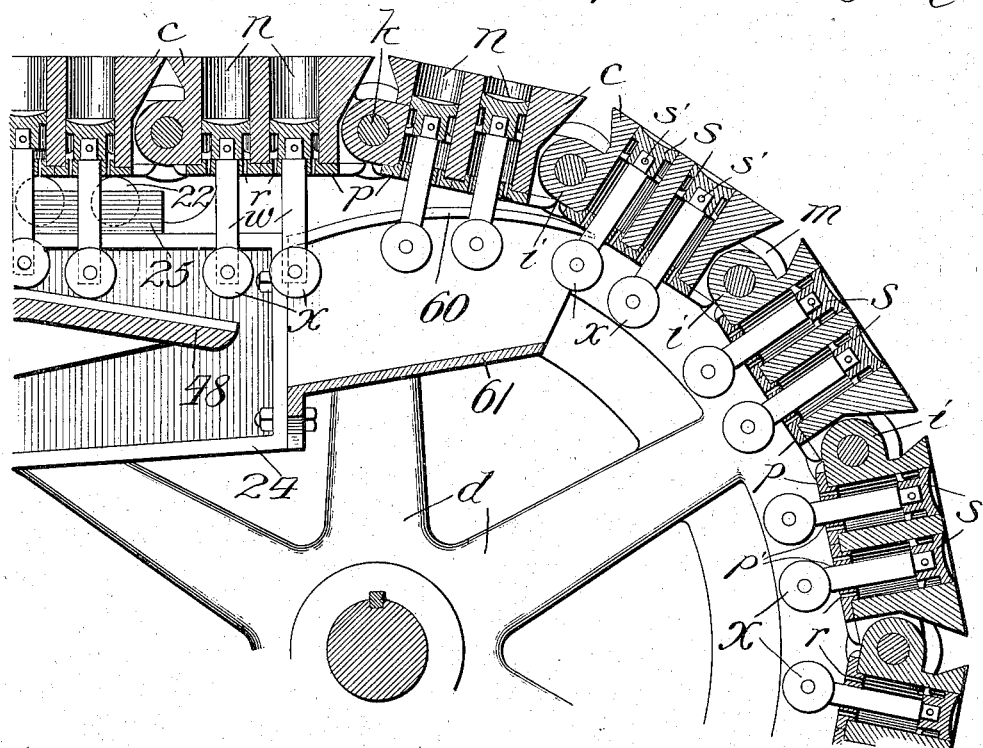

The granular or pulverulent or semiplastic material or mixture 50 which is to be formed into briquets is fed into a hopper 51 and stirred by means of any suitable stirrer mechanism—such, for example, as that shown at 52. The material is fed upon the lower belt, the links *c* of which meet at their edges, as shown, to form a substantial continuous dust-tight platform. As the links pass beneath the hopper 51 the material 50 descends into the molds *n*, filling the same, as shown in Fig. 6. As the molds move beyond the hopper the surfaces of the links are cleaned by an oblique scraper 53, which may be a strip of rubber or other suitable wiping material extending across the frame. In the further movement of the belts the upper and lower links come together, the mold-covers 12 registering exactly with the molds *n*. In the further travel of the belts the plunger-rollers *x* move from the track-sections 26 to the inclined track-sections 27 and rise gradually until they reach the highest point 55. (Shown in Fig. 5.) In their movement across the inclined track-sections 27 the plunger-heads *s* are raised very gradually, compressing the briquet material against the mold-covers 12 until the rollers pass the highest points 55, where the greatest and final compression takes place. The springs 20 are tensioned to hold the covers 12 yieldingly down with desired force. When the molds *n* have a diameter of three inches, to produce briquets of that diameter the springs 20 should possess a resistance of preferably about three thousand five hundred pounds. Under the final compression when the rollers move over the parts 55 of the tracks the springs 20 may yield slightly and expand again without too sudden jar as the rollers *x* move along the inclined end portions 49 of the tracks. When the links of the lower belt pass beyond the position shown in Fig. 4 to that shown in Fig. 8, the rollers *x* move against the surface of gradually-inclined frames or tracks 56, which cause the plungers to be forced gradually outward to discharge the briquets 57, as shown. In crossing the lower stretch between the sprocket-wheels *e d* the rollers *m* ride upon bearing-tracks 58, which rest upon set-screws 59, whereby they may be raised and lowered, as desired. As the links move toward the upper side of the sprocket-wheels *d*, as shown in Fig. 7, the rollers *x* are engaged by forward-projecting backwardly-curved retracting-forks 60. The forks or plates 60 are mounted, as shown in Fig. 11, upon ribbed blocks 61. The forks or plates at their free ends engage the upper sides of the rollers at opposite sides of the stems *w*, and in the movement of the links the rollers are drawn downward to move the plunger-heads to the bases of the molds *n*, as illustrated.

Above the lower stretch of the upper belt is an unyielding platform 62, (see Figs. 3 and 5,) in the under face of which is journaled a plurality of transverse shafts 63, formed with rollers 64. The rollers form an unyielding bed to take the thrust against the links 2 while the briquets are undergoing compression. As each shaft 63 is formed with six rollers 64, as shown in Fig. 3, and as each link during the compressing operation is engaged by three such sets of rollers, or eighteen in all, they resist the thrust at all parts while sliding against the antifriction-surface. At the upper stretch of the upper belt between the sprocket-wheels 4 3 are tracks 65, which sustain the links along said stretch.

It will be apparent from the drawings that the machine is driven by the two drive-shafts *f* and 5 and that the sprocket-wheels *d* 3 are turned by the lower and upper molding-belts. The engagements between the belts and sprocket-wheels is at the end rollers *m* 10, which fit closely the peripheral sockets in said wheels.

Mounted in a counterbalance-frame beneath the sprocket-wheels *d* is a brush 66, which is caused to rotate in the direction opposite the direction of movement of the belt to clean the links before they rise to the position of receiving the material to be molded. The links *c* are beveled at opposite sides, as shown, so that the lines of contact are at sharp knife-blade edges, which preclude the collection of dust or the like between them. The brush 66 is suitably geared to the nearest or most convenient shaft to be rotated thereby. Above the upper stretch of the upper belt is a rotary brush 67 on a frame 68, carrying a counterweight 69, which permits the brush to bear with desired gentleness upon the links. The brush is geared in a suitable manner to rotate in the direction contrary to the movement of the belt to clean the faces of the links 2 of any dust or material that may collect thereon. The brushes 66, 67, and scraper 53 serve to prevent material from becoming packed between the meeting faces of the links.

Certain desirable materials for use in the manufacture of fuel-briquets do not adhere sufficiently if the molds are very cold. It is desirable, therefore, in compressing a mixture containing asphaltum, for example, or the like to maintain the molds at a temperature above that which would tend to chill the material. For this purpose steam-coils 70 are provided close to the path of the upper stretch of the upper belt, and steam-coils 71 are provided close to the under side of the lower stretch of the lower belt.

The plunger-heads *s* fit the molds *n* with sufficient looseness to permit air expelled while the material is being compressed to pass downward and out through the perforations *r*.

The tracks 26 and 27 may be readily raised and lowered by turning the jack-screws, as described. Thus the descent of the plungers may be controlled to regulate the capacity of the molds, and the thrust of the plungers may also be regulated by raising or lowering the tracks at 55 to regulate the degree of compression upon the briquets.

If desired, the rollers *x* may be dispensed with and the stems $w$ caused to slide on the tracks, or they may be mounted like four-wheel carriages. The outer links $l$ 9 may also be dispensed with, the interlocking means 1 21 changed as desired, and other variations in details of construction made without departing from the spirit of the invention.

What I claim as new, and desire to secure by Letters Patent, is—

1. In a briqueting-machine, the combination with companion traveling belts provided respectively with molds and mold-covers, plungers in the molds, and means for feeding material to the molds, of an inclined-plane support across which the plungers move to effect the compression, and means for adjusting the said support with reference to the path of the mold-carrying belt.

2. In a briqueting-machine, the combination with companion traveling belts provided respectively with molds and mold-covers, plungers in the molds, and means for feeding material to the molds, of an inclined-plane support across which the plungers move to effect the compression, and jack-screws upon which said support is mounted to be raised and lowered.

3. In a briqueting-machine, the combination with companion traveling belts provided respectively with molds and mold-covers, plungers in the molds, and means for feeding material to the molds, of an inclined-plane support across which the plungers move to effect the compression, jack-screws upon which said support is mounted, and operating means for the jack-screws at the side of the machine, substantially as set forth.

4. In a briqueting-machine, the combination with companion traveling belts provided respectively with molds and mold-covers, plungers in the molds, and means for feeding material to the molds, of a support across which the plungers move to effect the compression comprising a forward section, and a rear section presenting an inclined plane, the sections being independently adjustable to regulate the capacity of the molds and the compression, substantially as set forth.

5. In a briqueting-machine, the combination with companion traveling belts provided respectively with molds and mold-covers, plungers in the molds, and means for feeding material to the molds, of a support, across which the plungers move to effect the compression, comprising a forward horizontally-disposed section and a rear section presenting an inclined plane, the sections being hinged together, jack-screws beneath the forward section and beneath the forward and rear end portions of the rear section, and operating means for the jack-screws, substantially as and for the purpose set forth.

6. In a briqueting-machine, the combination with companion traveling belts provided respectively with molds and mold-covers, plungers in the molds, and means for actuating the plungers in the movement of the belts, of independent cushioning means for each said mold-covers, substantially as set forth.

7. In a briqueting-machine of the character described, the combination with an endless series of mold-links, of plungers therein, each comprising a head $s$ having an outer flange, an annular recess $t$ and a recessed guide-flange $v$, a stem for the head and a guide-cap through which the stem moves provided with vent-openings, all constructed to operate substantially as described.

8. In a briqueting-machine of the character described, the combination with the endless mold-belt provided with plungers, of a companion belt formed of an endless series of links each provided with a plurality of independently-yielding mold-covers, substantially as set forth.

9. In a briqueting-machine of the character described, the combination with the traveling mold-belt provided with plungers of a companion belt comprising an endless series of links, each having a plurality of independently-yielding mold-covers, and an unyielding bed across which said links move during the compressing operation.

10. In a briqueting-machine of the character described, a belt formed of an endless series of links, each provided with a plurality of openings through it, mold-covers in said openings, shoulders against which said mold-covers rest, spring-pressed followers in said openings and set-screws adjustable in said followers and bearing against said covers.

11. In a briqueting-machine of the character described, a belt consisting of an endless series of links each provided with a plurality of openings through it, shoulders in said openings, mold-covers in said openings, a cap-plate on each link, a follower in each said opening, stiff springs confined between the followers and cap-plate and set-screws extending through the said followers and bearing against the mold-covers, substantially as described.

12. In a briqueting-machine of the character described, a belt consisting of an endless series of links each provided with a plurality of openings through it, shoulders in said openings, mold-covers in said openings, a cap-plate on each link provided with perforations registering with said openings, a follower in each said opening, stiff springs confined between the followers and cap-plate and set-screws extending through the said followers and bearing against the mold-covers, substantially as described.

13. In a briqueting-machine of the character described, a lower mold-belt consisting of an endless series of links provided with molds and plungers in the molds, an antifriction-support for the upper stretch of said lower belt comprising parallel longitudinally-extending lubricant-holding troughs and antifriction-rollers journaled in said troughs for the links to slide over during the compressing operation.

14. In a briqueting-machine of the character described, the combination with the companion traveling belts provided respectively with molds and mold-covers, of heating means for the said belts, substantially as and for the purpose set forth.

15. In a briqueting-machine of the character described, the combination with companion traveling belts provided respectively with molds and mold-covers, of heating means for the belts comprising steam-conducting pipes mounted in the frame of the machine close to the path of the upper stretch of the upper belt and close to the path of the lower stretch of the lower belt, substantially as set forth.

16. In a briqueting-machine of the character described, means for cleaning the belts in their movement from the discharge end toward the receiving end of the machine comprising cylindrical brushes, counterweighted frames in which the brushes are journaled and by which they are held yieldingly against said belts, and means for rotating said brushes in the direction contrary to the movement of the belts.

WILLIAM A. KÖNEMAN.

In presence of—
  WALTER N. WINBERG,
  L. HEISLAR.